(12) United States Patent
Ozasa et al.

(10) Patent No.: US 11,664,161 B2
(45) Date of Patent: May 30, 2023

(54) FILM CAPACITOR

(71) Applicant: Murata Manufacturing Co., Ltd., Nagaokakyo (JP)

(72) Inventors: Senichi Ozasa, Nagaokakyo (JP); Takuya Sakamoto, Nagaokakyo (JP); Satoru Jogan, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 375 days.

(21) Appl. No.: 16/887,000

(22) Filed: May 29, 2020

(65) Prior Publication Data

US 2020/0294716 A1 Sep. 17, 2020

Related U.S. Application Data

(63) Continuation of application No. PCT/JP2018/047231, filed on Dec. 21, 2018.

(30) Foreign Application Priority Data

Feb. 5, 2018 (JP) .............................. JP2018-018221

(51) Int. Cl.
*H01G 4/012* (2006.01)
*H01G 4/33* (2006.01)
(Continued)

(52) U.S. Cl.
CPC .............. *H01G 4/012* (2013.01); *H01G 4/33* (2013.01); *H01G 4/18* (2013.01); *H01G 4/32* (2013.01)

(58) Field of Classification Search
CPC .......... H01G 4/012; H01G 4/015; H01G 4/18; H01G 4/32; H01G 4/33
See application file for complete search history.

(56) References Cited

U.S. PATENT DOCUMENTS 5,608,600 A * 3/1997 Lavene ................. H01G 4/012
29/25.42
5,696,663 A * 12/1997 Unami .................. H01G 4/015
361/309

(Continued)

FOREIGN PATENT DOCUMENTS

CN 102796985 A 11/2012
CN 202766610 U 3/2013
(Continued)

OTHER PUBLICATIONS

International Search Report Issued for PCT/JP2018/047231, dated Mar. 11, 2019.

(Continued)

*Primary Examiner* — Nathan Milakovich
(74) *Attorney, Agent, or Firm* — ArentFox Schiff LLP

(57) ABSTRACT

A film capacitor including a first dielectric film, a second dielectric film, a first internal electrode, a second internal electrode, a first external electrode, and a second external electrode. The first internal electrode includes a first connection portion, a first main electrode portion contiguous with the first connection portion and thinner than the first connection portion, and a first thin film portion extending from the first main electrode portion and thinner than the first main electrode portion. The second internal electrode includes a second connection portion and a second main electrode portion contiguous with the second connection portion and thinner than the second connection portion. The first main electrode portion opposes the second main electrode portion with the first dielectric film interposed therebetween and does not oppose the second connection portion, and the first thin film portion opposes the second connection portion with the first dielectric film interposed therebetween.

19 Claims, 5 Drawing Sheets

(51) Int. Cl.
  *H01G 4/18* (2006.01)
  *H01G 4/32* (2006.01)

(56) References Cited

U.S. PATENT DOCUMENTS

| | | | | |
|---|---|---|---|---|
| 5,757,607 | A | * | 5/1998 | Folli ............... H01G 4/012 361/290 |
| 6,018,454 | A | | 1/2000 | Hatada et al. |
| 6,222,721 | B1 | * | 4/2001 | Vetter ............. H01G 4/008 361/311 |
| 7,027,286 | B2 | | 4/2006 | Shiota et al. |
| 2006/0050467 | A1 | | 3/2006 | Shiota et al. |
| 2008/0259522 | A1 | | 10/2008 | Okuno et al. |
| 2014/0368970 | A1 | * | 12/2014 | Ichikawa ......... C08G 18/6212 525/534 |
| 2020/0335283 | A1 | * | 10/2020 | Ozasa ............... H01G 4/33 |

FOREIGN PATENT DOCUMENTS

| | | | |
|---|---|---|---|
| CN | 205354876 U | | 6/2016 |
| CN | 205428701 U | * | 8/2016 |
| CN | 205428701 U | | 8/2016 |
| CN | 207183077 U | | 4/2018 |
| CN | 108711512 A | * | 10/2018 |
| JP | H03122527 U | | 12/1991 |
| JP | H10303056 A | | 11/1998 |
| JP | 2004134561 A | | 4/2004 |
| JP | 2012222127 A | | 11/2012 |
| JP | 2013219094 A | | 10/2013 |
| JP | 2015106608 A | * | 6/2015 |
| WO | 2006112099 A1 | | 10/2006 |
| WO | 2013069485 A | | 5/2013 |
| WO | 2013069485 A1 | | 5/2013 |
| WO | 2015041126 A1 | | 3/2015 |
| WO | WO-2016072671 A1 * | 5/2016 | ............... H01G 4/32 |
| WO | WO-2016150298 A1 * | 9/2016 | ............... H01G 4/32 |

OTHER PUBLICATIONS

Written Opinion of the International Searching Authority issued for PCT/JP2018/047231, dated Mar. 11, 2019.

* cited by examiner

FILM CAPACITOR

CROSS REFERENCE TO RELATED APPLICATIONS

The present application is a continuation of International application No. PCT/JP2018/047231, filed Dec. 21, 2018, which claims priority to Japanese Patent Application No. 2018-018221, filed Feb. 5, 2018, the entire contents of each of which are incorporated herein by reference.

FIELD OF THE INVENTION

The present invention relates to a film capacitor.

BACKGROUND OF THE INVENTION

As one type of capacitor, there is a film capacitor formed by winding or stacking a dielectric film that has a metal deposition film on a surface thereof and which is to be an internal electrode.

In film capacitors such as those described in Patent Documents 1 and 2, a so-called heavy edge structure is widely used in which, in order to enhance the self-healing property (the property of healing the insulating property by scattering a metal deposition film due to discharge of an insulation defective portion), an internal electrode which is a portion forming a capacitance (hereinafter also referred to as a main electrode portion) is thinned, while an internal electrode which is a portion connected to an external electrode and provided on both end surfaces (hereinafter also referred to as a connection portion) is thickened.

Further, as described in Patent Documents 1 and 2, there has also been proposed a configuration in which a slit without metal is formed in an internal electrode to divide the electrode into a plurality of divided electrodes, and the divided electrodes are connected in parallel by a fuse formed between the slits. This is to form a self-protection function in which a fuse around an insulation defective portion is fused by a short-circuit current at the time of self-healing to separate the insulation defective portion from an electric circuit.

As a material of the dielectric film constituting the film capacitor, conventionally, polypropylene (PP) has been used, but, as described in Patent Document 3, a thermosetting resin having high heat resistance is also known to be used.

Patent Document 1: Japanese Patent Application Laid-Open No. 2013-219094
Patent Document 2: Japanese Patent Application Laid-Open No. 2004-134561
Patent Document 3: WO 2013/069485 A

SUMMARY OF THE INVENTION

FIG. 1 of Patent Document 1 describes a structure in which an end (a boundary portion between a main electrode portion and an insulation margin) of the main electrode portion constituting one internal electrode opposes a connection portion constituting the other internal electrode via a dielectric film. However, in a place where the end of the main electrode portion constituting the one internal electrode and the connection portion constituting the other internal electrode overlap, electric field concentration causes frequent discharge, which can cause dielectric breakdown. In particular, when a thermosetting resin described in Patent Document 3 is used as a material for the dielectric film, the self-healing property is inferior to the case where a conventional PP film is used, and dielectric breakdown easily occurs.

Therefore, as described in FIG. 3 of Patent Document 2, a structure in which a width of a connection portion is reduced, and an end of a main electrode portion constituting one internal electrode does not oppose a connection portion constituting the other internal electrode via a dielectric film. However, in such a structure, the connection with an external electrode is insufficient due to the narrow width of the connection portion, and the current resistance performance can be impaired.

The present invention has been made to solve the above problems, and it is an object of the present invention to provide a film capacitor that has high self-healing property and in which occurrence of dielectric breakdown is suppressed.

A film capacitor of the present invention in a first aspect includes a stacked body including a first dielectric film having a first surface and a second surface opposite to the first surface; a second dielectric film having a first surface and a second surface opposite to the first surface, the second dielectric film being arranged such that the first surface of the second dielectric film opposes the second surface of the first dielectric film; a first internal electrode on the first surface of the first dielectric film, the first internal electrode including a first connection portion, a first main electrode portion contiguous with the first connection portion and thinner than the first connection portion, and a first thin film portion extending from the first main electrode portion and thinner than the first main electrode portion; and a second internal electrode between the first dielectric film and the second dielectric film, the second internal electrode including a second connection portion, and a second main electrode portion contiguous with the second connection portion and thinner than the second connection portion, wherein the first main electrode portion opposes the second main electrode portion with the first dielectric film interposed therebetween, and does not oppose the second connection portion, and the first thin film portion opposes the second connection portion with the first dielectric film interposed therebetween. A first external electrode is on a first end surface of the stacked body and electrically connected to the first connection portion of the first internal electrode and separated from the second internal electrode; and a second external electrode is on a second end surface of the stack body opposite the first end surface and electrically connected to the second connection portion of the second internal electrode and separated from the first internal electrode.

In the first aspect, it is desirable that the second internal electrode further include a second thin film portion extending from the second main electrode portion toward the first external electrode and thinner than the second main electrode portion, the second main electrode portion not oppose the first connection portion with the first dielectric film interposed therebetween, and the second thin film portion oppose the first connection portion with the first dielectric film interposed therebetween.

It is desirable that a maximum thickness of the first thin film portion be smaller than a difference between a maximum thickness of the first connection portion and a maximum thickness of the first main electrode portion.

It is desirable that the maximum thickness of the first thin film portion be 7 nm or less.

It is desirable that the first thin film portion extend to oppose both the second main electrode portion and the second connection portion.

It is desirable that, in the direction from the first external electrode to the second external electrode, the first thin film portion be shorter than the first main electrode portion, and the first thin film portion opposing the second main electrode portion be longer than the first thin film portion opposing the second connection portion.

It is desirable that, in the direction from the first external electrode toward the second external electrode, a length of the first thin film portion opposing the second main electrode portion be 4 mm or less.

It is desirable that the second connection portion be made of a material having lower electrical conductivity than the first thin film portion.

It is desirable that the second internal electrode be on the first surface of the second dielectric film, and the second connection portion be made of a material having lower electrical conductivity on a side opposing the first thin film portion with the first dielectric film interposed therebetween than on a side opposing the second dielectric film.

It is desirable that the second connection portion be made of a material containing zinc as a main component, and the first thin film portion be made of a material containing aluminum as a main component.

It is desirable that the first dielectric film contain a curable resin as a main component, and the second dielectric film contain a curable resin as a main component.

A film capacitor of the present invention in a second aspect includes a stacked body including a first dielectric film having a first surface and a second surface opposite to the first surface; a second dielectric film having a first surface and a second surface opposite to the first surface, the second dielectric film being arranged such that the first surface of the second dielectric film opposes the second surface of the first dielectric film; a first internal electrode on the first surface of the first dielectric film, the first internal electrode including a first main electrode portion, and a first thin film portion extending from the first main electrode portion and thinner than the first main electrode portion; and a second internal electrode between the first dielectric film and the second dielectric film, the second internal electrode including a first connection portion, a second main electrode portion contiguous with the first connection portion and thinner than the first connection portion, a second connection portion, and a third main electrode portion separated from the second main electrode portion and contiguous with the second connection portion and thinner than the second connection portion, wherein the first main electrode portion opposes the second main electrode portion and the third main electrode portion with the first dielectric film interposed therebetween, and does not oppose the second connection portion, and the first thin film portion opposes the second connection portion with the first dielectric film interposed therebetween. A first external electrode is on a first end surface of the stacked body and electrically connected to the first connection portion of the second internal electrode and separated from the first internal electrode; and a second external electrode is on a second end surface of the stack body opposite the first end surface and electrically connected to the second connection portion of the second internal electrode and separated from the first internal electrode.

In the second aspect, it is desirable that the first internal electrode further include a second thin film portion extending from the first main electrode portion toward the first external electrode and thinner than the first main electrode portion, the first main electrode portion not oppose the first connection portion with the first dielectric film interposed therebetween, and the second thin film portion oppose the first connection portion with the first dielectric film interposed therebetween.

According to the present invention, it is possible to provide a film capacitor that has high self-healing property and in which occurrence of dielectric breakdown is suppressed.

DETAILED DESCRIPTION OF THE INVENTION

Hereinafter, the film capacitor of the present invention will be described.

However, the present invention is not limited to the configuration described below, but can be appropriately changed and applied without changing the gist of the present invention.

Combinations of two or more of individual desirable configurations of the present invention described below are also the present invention.

The film capacitor of the present invention is characterized in that a thin film portion of a first internal electrode opposes a connection portion of a second internal electrode via a first dielectric film. That is, the thin film portion is provided at an end of the first internal electrode located at a position overlapping with the connection portion of the second internal electrode, such that the first internal electrode is thinned. Therefore, self-healing can be achieved even when discharge frequently occurs at a portion where the end of the first internal electrode and the connection portion of the second internal electrode overlap, thereby suppressing the occurrence of dielectric breakdown.

Each embodiment described below is an example, and it will be self-evident from the present disclosure that the configurations illustrated in the different embodiments can be partially replaced or combined. In the second and subsequent embodiments, description of matters common to the first embodiment will be omitted, and only different points will be described. In particular, the same operation and effect of the same configuration will not be sequentially described for each embodiment.

The film capacitor of the present invention may be a wound-type film capacitor in which a dielectric film having an internal electrode on a surface thereof is wound in a stacked state or may be a stack-type film capacitor in which a dielectric film having an internal electrode on a surface thereof is stacked.

When the film capacitor of the present invention is a wound-type film capacitor, the wound body of the dielectric film may be pressed flat into an elliptical shape or oval shape in section so as to have a more compact shape. Further, when the film capacitor of the present invention is a wound-type film capacitor, it may include a cylindrical winding shaft. The winding shaft is disposed on the center axis of the dielectric film in the wound state, and serves as a wind shaft when winding the dielectric film.

FIRST EMBODIMENT

In the film capacitor according to the first embodiment of the present invention, the first external electrode is connected to the first internal electrode and is separated from the second internal electrode, and the second external electrode is connected to the second internal electrode and is separated from the first internal electrode. In the first embodiment, the second internal electrode is provided on a first surface of the second dielectric film.

Figure 1:
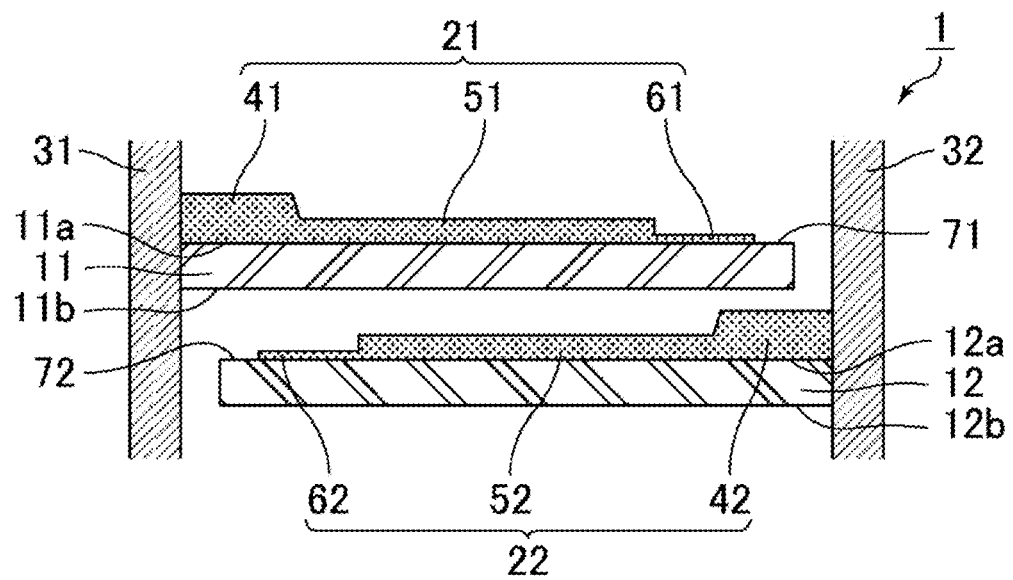
FIG. 1 is a sectional view schematically illustrating an example of a film capacitor according to a first embodiment of the present invention.
Figure 2:
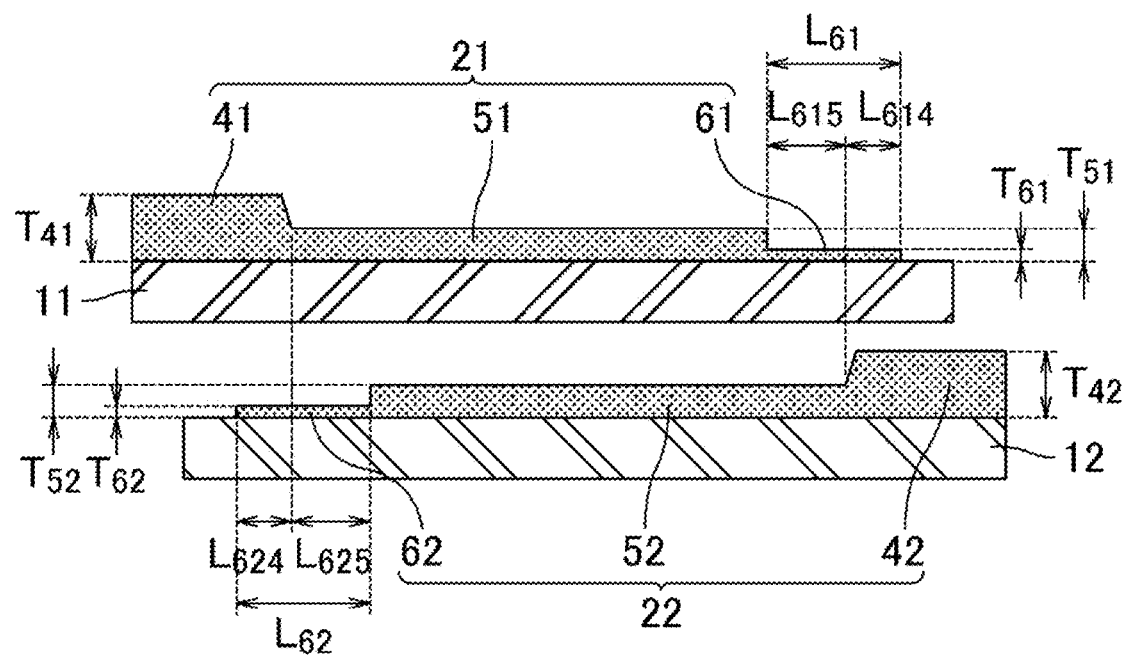
FIG. 2 is an enlarged view of a portion of the film capacitor illustrated in FIG. 1, excluding a first external electrode and a second external electrode.
Figure 3:
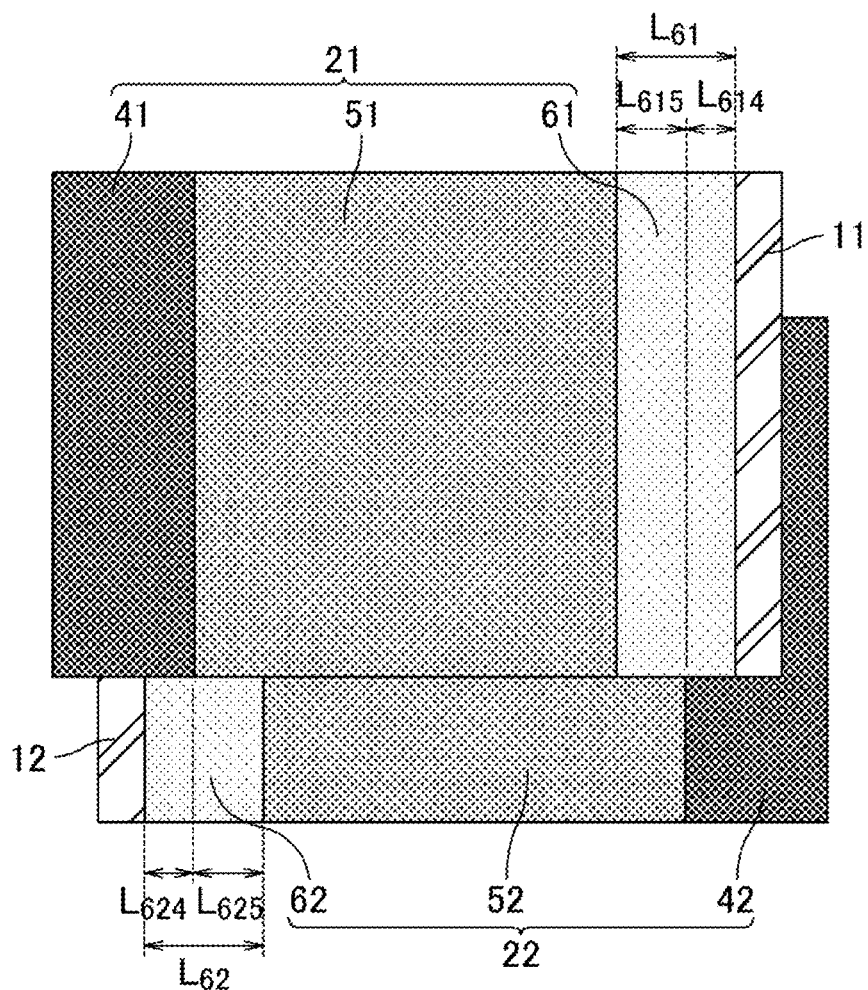
FIG. 3 is a plan view schematically illustrating an example of the first internal electrode and the second internal electrode constituting the film capacitor illustrated in FIG. 1.

FIG. 1 is a sectional view schematically illustrating an example of the film capacitor according to the first embodiment of the present invention. FIG. 2 is an enlarged view of a portion of the film capacitor illustrated in FIG. 1 excluding the first external electrode and the second external electrode. FIG. 3 is a plan view schematically illustrating an example of the first internal electrode and the second internal electrode constituting the film capacitor illustrated in FIG. 1.

In FIG. 1, for the sake of convenience, a first dielectric film 11 and a second dielectric film 12 are illustrated as being separated from each other, but in an actual film capacitor, the first dielectric film and the second dielectric film are stacked without a gap.

Although the overall configuration is not illustrated in FIG. 1, a film capacitor 1 includes the first dielectric film 11, the second dielectric film 12 stacked on the first dielectric film 11, and a first internal electrode 21 and a second internal electrode 22 that oppose each other with the first dielectric film 11 interposed therebetween. The film capacitor 1 further includes a first external electrode 31 connected to the first internal electrode 21 and separated from the second internal electrode 22, and a second external electrode 32 connected to the second internal electrode 22 and separated from the first internal electrode 21.

Figure 4:
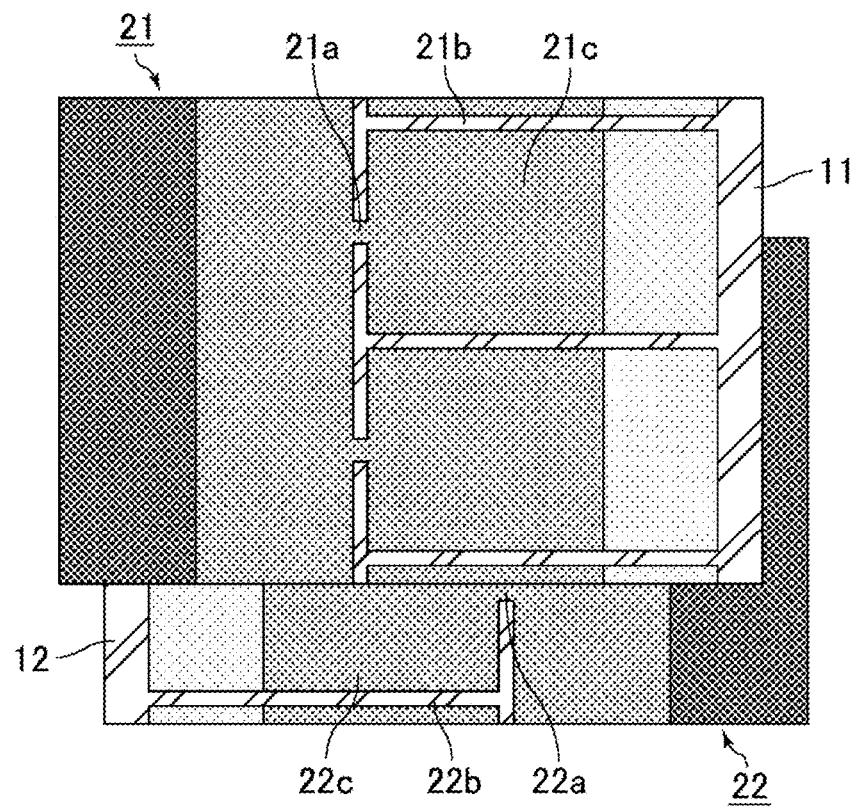
FIG. 4 is a plan view schematically illustrating another example of the first internal electrode and the second internal electrode constituting the film capacitor illustrated in FIG. 1.

FIG. 4 is a plan view schematically illustrating another example of the first internal electrode and the second internal electrode constituting the film capacitor illustrated in FIG. 1.

As illustrated in FIG. 4, the first internal electrode 21 may include a fuse portion 21a where a part of the electrode is thinned, and a divided electrode 21c divided by an insulation slit 21b. Similarly, the second internal electrode 22 may include a fuse portion 22a where a part of the electrode is thinned, and a divided electrode 22c divided by an insulation slit 22b.

In the film capacitor 1 illustrated in FIG. 1, the first dielectric film 11 has a first surface 11a and a second surface 11b opposite the first surface 11a. Similarly, the second dielectric film 12 has a first surface 12a and a second surface 12b opposite the first surface 12a. The first dielectric film 11 and the second dielectric film 12 are stacked such that the second surface 11b of the first dielectric film 11 opposes the first surface 12a of the second dielectric film 12.

The first internal electrode 21 is provided on the first surface 11a of the first dielectric film 11 so as to reach one side edge but not the other side edge of the first dielectric film 11. Therefore, an insulation margin 71 where the first internal electrode 21 is not provided exists at the other side edge of the first surface 11a of the first dielectric film 11.

The second internal electrode 22 is provided on the first surface 12a of the second dielectric film 12 so as not to reach one side edge but reach the other side edge of the second dielectric film 12. Therefore, an insulation margin 72 where the second internal electrode 22 is not provided exists at the one side edge of the first surface 12a of the second dielectric film 12.

In FIG. 1, the first dielectric film 11 and the second dielectric film 12 are stacked so as to be displaced from each other in the width direction (right-and-left direction in FIG. 1) so that the end of the first internal electrode 21 on the side reaching the side edge of the first dielectric film 11 and the end of the second internal electrode 22 on the side reaching the side edge of the second dielectric film 12 are exposed from the stacked films. When the film capacitor 1 illustrated in FIG. 1 is a wound-type film capacitor, the first dielectric film 11 and the second dielectric film 12 are wound in a stacked state, so that the state where the first internal electrode 21 and the second internal electrode 22 are exposed at opposed ends of the wound body is maintained in a stacked state.

The first external electrode 31 and the second external electrode 32 are formed by spraying, for example, zinc or the like on each end surface of the stack body obtained as described above. The first external electrode 31 contacts the exposed end of the first internal electrode 21, and is thereby electrically connected to the first internal electrode 21. On the other hand, the second external electrode 32 contacts the exposed end of the second internal electrode 22, and is thereby electrically connected to the second internal electrode 22.

The first internal electrode 21 includes a first connection portion 41 connected to the first external electrode 31, a first main electrode portion 51 contiguous with the first connection portion 41, and a first thin film portion 61 extending from the first main electrode portion 51 toward the second external electrode 32. The first main electrode portion 51 is thinner than the first connection portion 41, and the first thin film portion 61 is thinner than the first main electrode portion 51.

The second internal electrode 22 includes a second connection portion 42 connected to the second external electrode 32, a second main electrode portion 52 contiguous with the second connection portion 42, and a second thin film portion 62 extending from the second main electrode portion 52 toward the first external electrode 31. The second main electrode portion 52 is thinner than the second connection portion 42, and the second thin film portion 62 is thinner than the second main electrode portion 52.

The first main electrode portion 51 of the first internal electrode 21 opposes the second main electrode portion 52 with the first dielectric film 11 interposed therebetween, but does not oppose the second connection portion 42 in a thickness direction of the first dielectric film 11. On the other hand, the first thin film portion 61 opposes the second connection portion 42 with the first dielectric film 11 interposed therebetween in the thickness direction of the first dielectric film 11.

The second main electrode portion 52 of the second internal electrode 22 does not oppose the first connection portion 41 with the first dielectric film 11 interposed therebetween in the thickness direction of the first dielectric film 11. On the other hand, the second thin film portion 62 opposes the first connection portion 41 with the first dielectric film 11 interposed therebetween in the thickness direction of the first dielectric film 11.

The first internal electrode 21 is desirably formed by the method described below. The second internal electrode 22 is also formed by the same method.

Figure 5A:
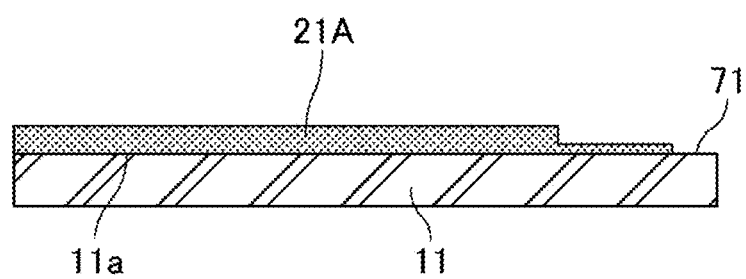
FIGS. 5(a) and 5(b) are sectional views schematically illustrating an example of a method for forming a first internal electrode.
Figure 5B:
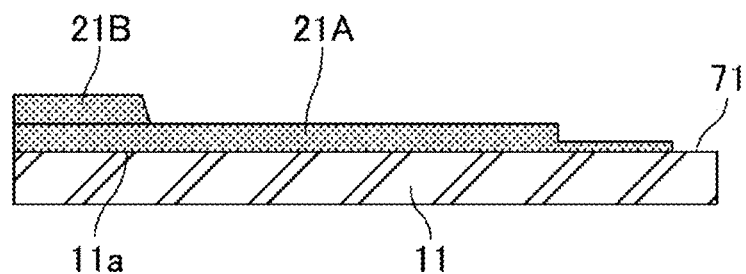

FIGS. 5(a) and 5(b) are sectional views schematically illustrating an example of a method for forming the first internal electrode.

First, as illustrated in FIG. 5(a), a metal such as aluminum is deposited on the first surface 11a of the first dielectric film 11 while forming the insulation margin 71 by a non-deposited portion at the other side edge, thereby forming a first metal deposition film 21A. When forming the first metal deposition film 21A, a portion to be the first thin film portion can be formed by reducing the amount of metal vapor compared to other portions. Examples include a method of adjusting a mask shape on a metal evaporation source side so as to make the opening area smaller than that of the other portions. Thereafter, as illustrated in FIG. 5(b), a metal such as zinc is deposited on the first metal deposition film 21A on the one side edge side of the first surface 11a of the first dielectric film 11, thereby forming a second metal deposition film 21B. The second metal deposition film 21B is desirably thicker than the first metal deposition film 21A. As a result, the first connection portion is formed on the one side edge side of the first surface 11a of the first dielectric film 11.

When the first internal electrode is formed by the above method, it is desirable that the first connection portion be made of a material containing zinc as a main component, and the first main electrode portion and the first thin film portion be made of a material containing aluminum as a main component. Similarly, when the second internal electrode is formed by the above method, it is desirable that the second connection portion be made of a material containing zinc as a main component, and the second main electrode portion and the second thin film portion be made of a material containing aluminum as a main component.

In the present specification, the "main component" means a component having the largest abundance proportion (% by weight), and preferably a component having an abundance proportion exceeding 50% by weight.

In the film capacitor 1 illustrated in FIG. 1, the first connection portion 41 has a region in which the thickness continually reduces from the first external electrode 31 toward the first main electrode portion 51, in addition to a flat region having a constant thickness. However, the shape of the first connection portion is not particularly limited as long as it is connected to the first external electrode 31 and is thicker than the first main electrode portion 51. Similarly, in the film capacitor 1 illustrated in FIG. 1, the second connection portion 42 has a region in which the thickness continually reduces from the second external electrode 32 toward the second main electrode portion 52, in addition to a flat region having a constant thickness. However, the shape of the second connection portion is not particularly limited as long as it is connected to the second external electrode 32 and is thicker than the second main electrode portion 52. The shape of the second connection portion may be the same as or different from the shape of the first connection portion.

In the film capacitor 1 illustrated in FIG. 1, the shape of the first thin film portion 61 is flat, but the shape of the first thin film portion is not particularly limited as long as it is thinner than the first main electrode portion 51. Similarly, in the film capacitor 1 illustrated in FIG. 1, the shape of the second thin film portion 62 is flat, but the shape of the second thin film portion is not particularly limited as long as it is thinner than the second main electrode portion 52. The shape of the second thin film portion may be the same as or different from the shape of the first thin film portion.

FIGS. 6(a), 6(b), 6(c), 6(d), and 6(e) are sectional views schematically illustrating another example of the first thin film portion.

Figure 6A:
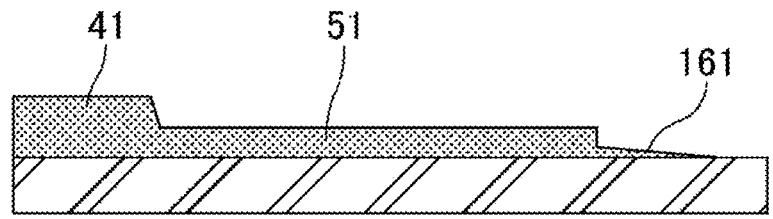
FIGS. 6(a), 6(b), 6(c), 6(d), and 6(e) are sectional views schematically illustrating another example of a first thin film portion.
Figure 6B:
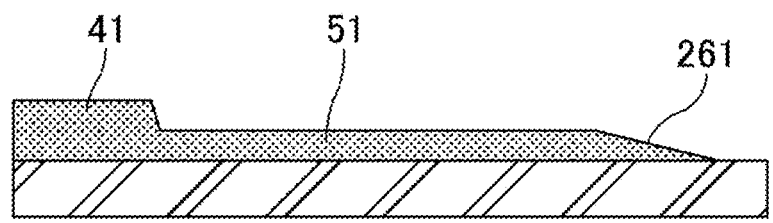
Figure 6C:
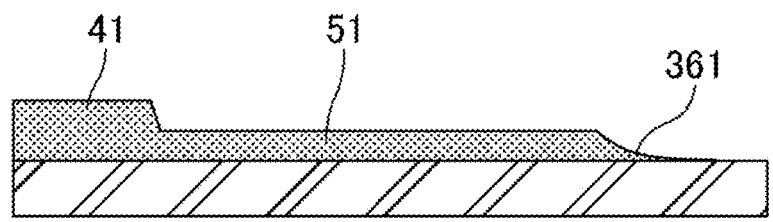
Figure 6D:
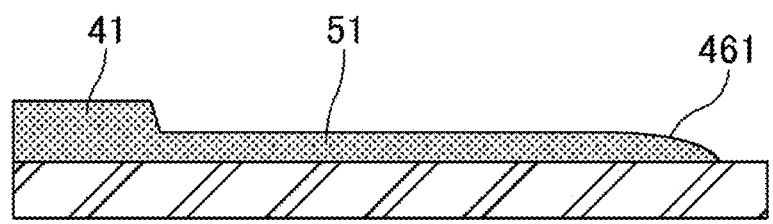
Figure 6E:
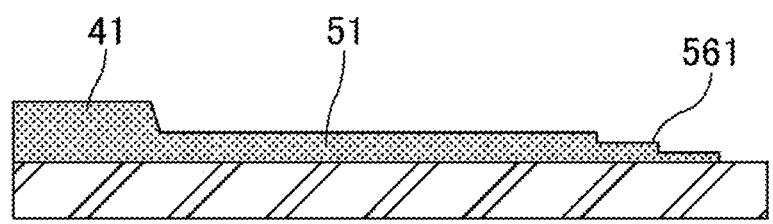

A first thin film portion 161 illustrated in FIG. 6(a), a first thin film portion 261 illustrated in FIG. 6(b), a first thin film portion 361 illustrated in FIG. 6(c), and a first thin film portion 461 illustrated in FIG. 6(d) each have a tapered shape in which the thickness is reduced from a first main electrode portion 51 to a second external electrode (not illustrated). Among them, the first thin film portion 161 illustrated in FIG. 6(a) has a linear tapered shape with a step, the first thin film portion 261 illustrated in FIG. 6(b) has a linear tapered shape without a step, the first thin film portion 361 illustrated in FIG. 6(c) has a curved tapered shape protruding downward, and the first thin film portion 461 illustrated in FIG. 6(d) has a curved tapered shape protruding upward. Further, a first thin film portion 561 illustrated in FIG. 6(e) has a stair shape.

As described above, the film capacitor according to the first embodiment of the present invention is characterized in that the first internal electrode includes the first thin film portion, and the first thin film portion opposes the second connection portion with the first dielectric film interposed therebetween.

On the other hand, in the film capacitor according to the first embodiment of the present invention, the second internal electrode may not include the second thin film portion, but it is desirable that the second internal electrode include the second thin film portion, and the second thin film portion oppose the first connection portion with the first dielectric film interposed therebetween. Dielectric breakdown can be further suppressed not only by providing the first thin film portion on the first internal electrode, but also by providing the second thin film portion on the second internal electrode.

In the film capacitor according to the first embodiment of the present invention, it is desirable that the first thin film portion oppose a region having a thickness equal to or greater than an average thickness in the second connection portion with the first dielectric film interposed therebetween. Further, it is desirable that the first thin film portion oppose the flat region of the second connection portion with the first dielectric film interposed therebetween. Furthermore, it is desirable that the first thin film portion oppose a region having the maximum thickness in the second connection portion with the first dielectric film interposed therebetween.

In the film capacitor according to the first embodiment of the present invention, when the second internal electrode includes the second thin film portion, it is desirable that the second thin film portion oppose the region having the thickness equal to or greater than the average thickness in the first connection portion with the first dielectric film interposed therebetween. Further, it is desirable that the second thin film portion oppose the flat region of the first connection portion with the first dielectric film interposed therebetween. Furthermore, it is desirable that the second thin film portion oppose the region having the maximum thickness in the first connection portion with the first dielectric film interposed therebetween.

In the film capacitor according to the first embodiment of the present invention, it is desirable that the second connection portion be made of a material having electrical conductivity lower than that of the first thin film portion. Specifically, it is desirable that the second connection portion be made of a material containing zinc as a main component, and the first thin film portion be made of a material containing aluminum as a main component.

When the first internal electrode and the second internal electrode are formed by the method as illustrated in FIGS. 5(a) and 5(b), it is desirable that the side of the second connection portion opposing the first thin film portion with the first dielectric film interposed therebetween (a portion corresponding to the second metal deposition film 21B in FIG. 5(b)) be made of a material having electrical conductivity lower than that of the side opposing the second dielectric film (a portion corresponding to the first metal deposition film 21A in FIG. 5(b)). Specifically, it is desirable that, within the second connection portion, the side opposing the first thin film portion with the first dielectric film interposed therebetween be made of a material containing zinc as a main component, and the side opposing the second dielectric film be made of a material containing aluminum as a main component.

In the film capacitor according to the first embodiment of the present invention, when the second internal electrode includes the second thin film portion, it is desirable that the first connection portion be made of a material having electrical conductivity lower than that of the second thin film portion. Specifically, it is desirable that the first connection portion be made of a material containing zinc as a main component, and the second thin film portion be made of a material containing aluminum as a main component.

When the first internal electrode and the second internal electrode are formed by the method as illustrated in FIGS. 5(a) and 5(b), it is desirable that a side of the first connection portion opposite the side opposing the second thin film portion with the first dielectric film interposed therebetween (a portion corresponding to the second metal deposition film 21B in FIG. 5(b)) be made of a material having electrical conductivity lower than that of the side opposing the second thin film portion with the first dielectric film interposed therebetween (a portion corresponding to the first metal deposition film 21A in FIG. 5(b)). Specifically, it is desirable that, within the first connection portion, the side opposite the side opposing the second thin film portion with the first dielectric film interposed therebetween be made of a material containing zinc as a main component, and the side opposing the second thin film portion with the first dielectric film interposed therebetween be made of a material containing aluminum as a main component.

In the film capacitor according to the first embodiment of the present invention, it is desirable that a maximum thickness of the first thin film portion (indicated by $T_{61}$ in FIG. 2) be smaller than a difference between a maximum thickness of the first connection portion (indicated by $T_{41}$ in FIG. 2) and a maximum thickness of the first main electrode portion (indicated by $T_{51}$ in FIG. 2).

In the film capacitor according to the first embodiment of the present invention, when the second internal electrode includes the second thin film portion, it is desirable that a maximum thickness of the second thin film portion (indicated by $T_{62}$ in FIG. 2) be smaller than a difference between a maximum thickness of the second connection portion (indicated by $T_{42}$ in FIG. 2) and a maximum thickness of the second main electrode portion (indicated by $T_{52}$ in FIG. 2).

Since the connection portion is thicker than the main electrode portion, both ends of a capacitor element are easily deformed to a large size due to the integration of the thickness of the connection portion. Therefore, by making the maximum thickness of the thin film portion smaller than the difference between the maximum thickness of the connection portion and the maximum thickness of the main electrode portion, deformation of both ends of the capacitor element can be suppressed.

The thickness of the internal electrode can be specified by observing a cross section cut in the thickness direction of the internal electrode using an electron microscope such as a field emission scanning electron microscope (FE-SEM).

In the film capacitor according to the first embodiment of the present invention, the maximum thickness of the first thin film portion is desirably 7 nm or less. On the other hand, in order to function as an electrode, the maximum thickness of the first thin film portion is desirably 2 nm or more.

In the film capacitor according to the first embodiment of the present invention, when the second internal electrode includes the second thin film portion, the maximum thickness of the second thin film portion is preferably 7 nm or less. On the other hand, in order to function as an electrode, the maximum thickness of the second thin film portion is desirably 2 nm or more.

When the maximum thickness of the thin film portion is 7 nm or less, the energy for evaporating or scattering the deposition film at the time of discharge can be reduced, and the self-healing property becomes favorable. Therefore, even if discharge occurs frequently at a portion where the end of one internal electrode overlaps with the connection portion of the other internal electrode, dielectric breakdown can be suppressed.

In the film capacitor according to the first embodiment of the present invention, it is desirable that the first thin film portion extend to oppose both the second main electrode portion and the second connection portion.

In the film capacitor according to the first embodiment of the present invention, when the second internal electrode includes the second thin film portion, it is desirable that the second thin film portion extend to oppose both the first main electrode portion and the first connection portion.

It is difficult to align the position of an interface between the main electrode portion and the thin film portion constituting one internal electrode with the position of an interface between the connection portion and the main electrode portion constituting the other internal electrode. In particular, in the case of a wound-type film capacitor, the positions of both are easily displaced. Therefore, by forming the thin film portion constituting one internal electrode so as to oppose both the main electrode portion and the connection portion of the other internal electrode, for example, the first thin film portion can consistently oppose the second connection portion.

Specifically, it is desirable that the first thin film portion extend from the second main electrode portion made of a material containing aluminum as a main component so as to oppose the second connection portion made of a material containing zinc as a main component. Further, when the second internal electrode includes the second thin film portion, it is desirable that the second thin film portion extend from the first main electrode portion made of a material containing aluminum as a main component so as to oppose the first connection portion made of a material containing zinc as a main component.

In the film capacitor according to the first embodiment of the present invention, it is desirable that, in the direction from the first external electrode to the second external electrode, the first thin film portion be shorter than the first main electrode portion, and the first thin film portion opposing the second main electrode portion be longer than the first thin film portion opposing the second connection portion.

In FIGS. 2 and 3, the length of the first thin film portion is indicated at $L_{61}$, the length of the first thin film portion opposing the second main electrode portion is indicated at $L_{615}$, and the length of the first thin film portion opposing the second connection portion is indicated at $L_{614}$.

In the film capacitor according to the first embodiment of the present invention, when the second internal electrode includes the second thin film portion, it is desirable that, in the direction from the first external electrode to the second external electrode, the second thin film portion be shorter than the second main electrode portion, and the second thin film portion opposing the first main electrode portion be longer than the second thin film portion opposing the first connection portion.

In FIGS. 2 and 3, the length of the second thin film portion is indicated at $L_{62}$, the length of the second thin film portion opposing the first main electrode portion is indicated at $L_{625}$, and the length of the second thin film portion opposing the first connection portion is indicated at $L_{624}$.

The length of the internal electrode can be specified by observing a cross section cut in the thickness direction of the internal electrode using an electron microscope such as a field emission scanning electron microscope (FE-SEM).

In the film capacitor according to the first embodiment of the present invention, it is desirable that the length $L_{61}$ of the first thin film portion in the direction from the first external electrode to the second external electrode be larger than a difference between the maximum thickness $T_{51}$ of the first main electrode portion and the maximum thickness $T_{61}$ of the first thin film portion.

In this case, it is desirable that the length $L_{61}$ of the first thin film portion be 50,000 times or more the difference between the maximum thickness $T_{51}$ of the first main electrode portion and the maximum thickness $T_{61}$ of the first thin film portion.

In the film capacitor according to the first embodiment of the present invention, when the second internal electrode includes the second thin film portion, it is desirable that the length $L_{62}$ of the second thin film portion in the direction from the first external electrode to the second external electrode be larger than a difference between the maximum thickness $T_{52}$ of the second main electrode portion and the maximum thickness $T_{62}$ of the second thin film portion.

In this case, it is desirable that the length $L_{62}$ of the second thin film portion be 50,000 times or more the difference between the maximum thickness $T_{52}$ of the second main electrode portion and the maximum thickness $T_{62}$ of the second thin film portion.

In the film capacitor according to the first embodiment of the present invention, in the direction from the first external electrode to the second external electrode, it is desirable that a length $L_{615}$ of the first thin film portion opposing the second main electrode portion be 4 mm or less. The length $L_{615}$ of the first thin film portion opposing the second main electrode portion may be 0 mm.

In the film capacitor according to the first embodiment of the present invention, when the second internal electrode includes the second thin film portion, it is desirable that a length $L_{625}$ of the second thin film portion opposing the first main electrode portion be 4 mm or less in a direction from the first external electrode toward the second external electrode. The length $L_{625}$ of the second thin film portion opposing the first main electrode portion may be 0 mm.

When the length of the thin film portion opposing the main electrode portion is 4 mm or less, dielectric breakdown can be suppressed, and an increase in ESR (equivalent series resistance) of the capacitor can also be suppressed. Therefore, a highly reliable capacitor having excellent electric characteristics can be obtained.

In the film capacitor according to the first embodiment of the present invention, the first dielectric film may include a curable resin such as a thermosetting resin as a main component, or may include a thermoplastic resin as a main component. Similarly, the second dielectric film may include a curable resin as a main component, or may include a thermoplastic resin as a main component. The second dielectric film may have a configuration different from that of the first dielectric film, but desirably has the same configuration as the first dielectric film.

Above all, the first dielectric film desirably contains a curable resin as a main component, and the second dielectric film desirably contains a curable resin as a main component. In particular, the first dielectric film desirably contains a thermosetting resin as a main component, and the second dielectric film desirably contains a thermosetting resin as a main component. Even if the film capacitor according to the first embodiment of the present invention uses a curable resin such as a thermosetting resin that is thermally stable as compared to PP as the material of the dielectric film, the capacitor self-heals easily and dielectric breakdown is suppressed such that a highly reliable and high heat-resistant capacitor can be obtained.

Hereinafter, when the first dielectric film and the second dielectric film are not particularly distinguished, they are simply referred to as the "dielectric film".

As described above, the "main component" means a component having the largest abundance proportion (% by weight), and preferably a component having an abundance proportion exceeding 50% by weight. Therefore, the dielectric film may contain, as a component other than the main component, for example, an additive such as a silicone resin or an uncured portion of a starting material such as a first organic material and a second organic material described below.

When the dielectric film contains a curable resin as a main component, the curable resin may be a thermosetting resin or a photocurable resin. The curable resin may or may not have at least one of a urethane bond and a urea bond.

The presence of a urethane bond and/or a urea bond can be confirmed using a Fourier transform infrared spectrophotometer (FT-IR).

In this specification, a thermosetting resin means a resin that can be cured by heat, and does not limit the curing method. Therefore, as long as the resin can be cured by heat, a resin cured by a method other than heat (for example, light, an electron beam, or the like) is also included in the thermosetting resin. In addition, depending on the material, the reaction may start due to the reactivity of the material itself, and those in which curing proceeds without necessarily being subject to heat or light from the outside are also a thermosetting resin. The same applies to the photocurable resin, and the curing method is not limited.

The dielectric film may contain a deposited polymer film as a main component. The deposited polymer film may or may not have at least one of a urethane bond and a urea bond. In addition, the deposited polymer film is basically included in the curable resin.

The dielectric film is desirably made of a cured material of the first organic material and the second organic material. Examples include a cured material obtained by reacting a hydroxyl group (OH group) of the first organic material with an isocyanate group (NCO group) of the second organic material.

When a cured material is obtained by the above reaction, an uncured portion of the starting material may remain in the film. For example, the dielectric film may contain at least one of an isocyanate group (NCO group) and a hydroxyl group (OH group). In this case, the dielectric film may contain one of an isocyanate group and a hydroxyl group, or may contain both an isocyanate group and a hydroxyl group.

The presence of an isocyanate group and/or a hydroxyl group can be confirmed using a Fourier transform infrared spectrophotometer (FT-IR).

The first organic material is desirably a polyol having a plurality of hydroxyl groups (OH groups) in a molecule. Examples of the polyol include polyether polyol, polyester polyol, and polyvinyl acetoacetal. As the first organic material, two or more organic materials may be used in combination. Among the first organic materials, phenoxy resins belonging to polyether polyols are desirable.

The second organic material is desirably an isocyanate compound, an epoxy resin or a melamine resin having a plurality of functional groups in a molecule. As the second organic material, two or more organic materials may be used in combination.

Examples of the isocyanate compound include aromatic polyisocyanates such as diphenylmethane diisocyanate (MDI) and tolylene diisocyanate (TDI), and aliphatic polyisocyanates such as hexamethylene diisocyanate (HDI). Modified bodies of these polyisocyanates, for example, modified bodies containing carbodiimide or urethane may be used. Among them, aromatic polyisocyanates are desirable, and MDI is more desirable.

The epoxy resin is not particularly limited as long as resin has an epoxy ring, and examples thereof include a bisphenol A type epoxy resin, a biphenyl skeleton epoxy resin, a cyclopentadiene skeleton epoxy resin, and a naphthalene skeleton epoxy resin.

The melamine resin is not particularly limited as long as it is an organic nitrogen compound having a triazine ring at the center of the structure and three amino groups around the triazine ring, and examples thereof include an alkylated melamine resin. In addition, a modified body of melamine may be used.

The dielectric film is desirably obtained by forming a resin solution containing the first organic material and the second organic material into a film shape, followed by curing by heat treatment.

When the dielectric film contains a thermoplastic resin as a main component, examples of the thermoplastic resin include highly crystalline polypropylene, polyether sulfone, polyetherimide, and polyarylate.

The dielectric film can also contain an additive for adding other functions. For example, smoothness can be imparted by adding a leveling agent. The additive is more desirably a material having a functional group that reacts with a hydroxyl group and/or an isocyanate group and forming a part of a crosslinked structure of a cured material. Examples of such material include a resin having at least one functional group selected from the group consisting of an epoxy group, a silanol group, and a carboxyl group.

The thickness of the dielectric film is not particularly limited, but if the film is too thin, it becomes likely to be brittle. Therefore, the thickness of the dielectric film is desirably more than 0.5 µm, more desirably 2 µm or more. On the other hand, if the film is too thick, defects such as cracks are likely to occur during film formation. Therefore, the thickness of the dielectric film is desirably less than 10 µm, more desirably 6 µm or less.

In addition, the thickness of the dielectric film can be measured using an optical film thickness gauge.

SECOND EMBODIMENT

In the film capacitor according to the second embodiment of the present invention, as in the first embodiment, the first external electrode is connected to the first internal electrode and is separated from the second internal electrode, and the second external electrode is connected to the second internal electrode and is separated from the first internal electrode. In the second embodiment, unlike the first embodiment, the second internal electrode is provided on a second surface of the first dielectric film.

Figure 7:
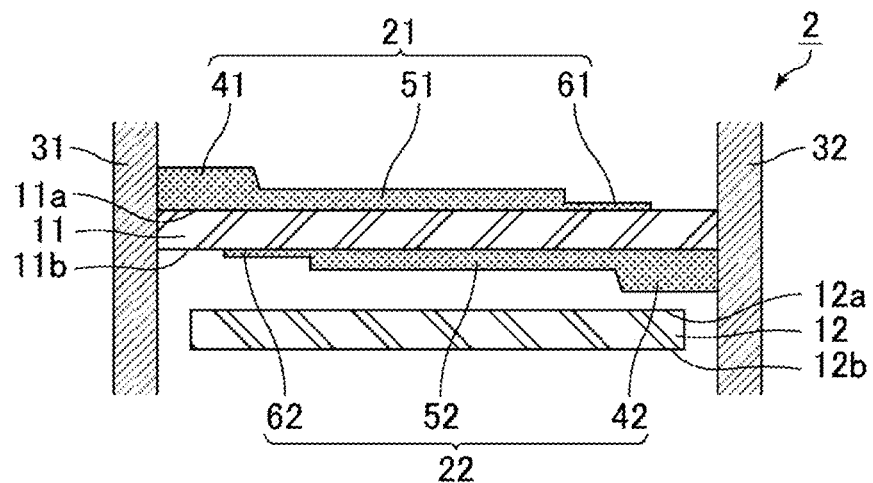
FIG. 7 is a sectional view schematically illustrating an example of a film capacitor according to a second embodiment of the present invention.

FIG. 7 is a sectional view schematically illustrating an example of the film capacitor according to the second embodiment of the present invention.

Although the overall configuration is not illustrated in FIG. 7, a film capacitor 2 includes a first dielectric film 11, a second dielectric film 12 stacked on the first dielectric film 11, and a first internal electrode 21 and a second internal electrode 22 that oppose each other with the first dielectric film 11 interposed therebetween. The film capacitor 2 further includes a first external electrode 31 connected to the first internal electrode 21 and separated from the second internal electrode 22, and a second external electrode 32 connected to the second internal electrode 22 and separated from the first internal electrode 21.

In the film capacitor 2 illustrated in FIG. 7, the first internal electrode 21 is provided on the first surface 11a of the first dielectric film 11, similarly to the film capacitor 1 illustrated in FIG. 1. On the other hand, unlike the film capacitor 1 illustrated in FIG. 1, the second internal electrode 22 is provided on the second surface 11b of the first dielectric film 11. The second dielectric film 12 is not provided with an internal electrode.

Similar to the film capacitor 1 illustrated in FIG. 1, the first internal electrode 21 includes a first connection portion 41 connected to the first external electrode 31, a first main electrode portion 51 contiguous with the first connection portion 41, and a first thin film portion 61 extending from the first main electrode portion 51 toward the second external electrode 32. Further, the second internal electrode 22 includes a second connection portion 42 connected to the second external electrode 32, a second main electrode portion 52 contiguous with the second connection portion 42, and a second thin film portion 62 extending from the second main electrode portion 52 toward the first external electrode 31.

The first internal electrode and the second internal electrode are desirably formed by the method illustrated in FIGS. 5(a) and 5(b). The second connection portion is desirably made of a material having a lower electrical conductivity on the side opposite the side opposing the first thin film portion with the first dielectric film interposed therebetween than on the side opposing the first thin film portion with the first dielectric film interposed therebetween. Further, when the second internal electrode includes the second thin film portion, the first connection portion is desirably made of a material having lower electrical conductivity on the side opposite the side opposing the second thin film portion with the first dielectric film interposed therebetween than on the side opposing the second thin film portion with the first dielectric film interposed therebetween.

The other configurations are the same as those of the first embodiment.

In the second embodiment having such configuration, the same operation and effect as in the first embodiment can be obtained.

THIRD EMBODIMENT

In the film capacitor according to the third embodiment of the present invention, unlike the first embodiment, both the first external electrode and the second external electrode are connected to the second internal electrode and are separated from the first internal electrode. In the third embodiment, the second internal electrode is provided on a first surface of the second dielectric film.

Figure 8:
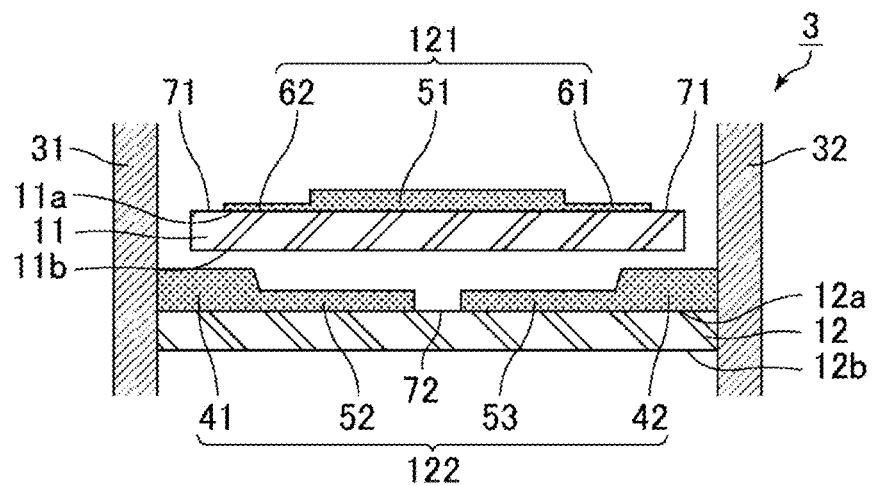
FIG. 8 is a sectional view schematically illustrating an example of a film capacitor according to a third embodiment of the present invention.

FIG. 8 is a sectional view schematically illustrating an example of the film capacitor according to the third embodiment of the present invention.

Although the overall configuration is not illustrated in FIG. 8, a film capacitor 3 includes a first dielectric film 11, a second dielectric film 12 stacked on the first dielectric film 11, and a first internal electrode 121 and a second internal electrode 122 that oppose each other with the first dielectric film 11 interposed therebetween. The film capacitor 3 further includes a first external electrode 31 connected to the second internal electrode 122 and separated from the first internal electrode 121, and a second external electrode 32 connected to the second internal electrode 122 and separated from the first internal electrode 121.

The first internal electrode 121 is provided on the first surface 11a of the first dielectric film 11 so as not to reach either of the side edges of the first dielectric film 11. Therefore, an insulation margin 71 where the first internal electrode 121 is not provided exists at both opposed side edges of the first surface 11a of the first dielectric film 11.

The second internal electrode 122 is provided on the first surface 12a of the second dielectric film 12, and is separated into two parts. Therefore, an insulation margin 72 where the second internal electrode 122 is not provided exists at the center of the first surface 12a of the second dielectric film 12.

The first internal electrode 121 includes a first main electrode portion 51, a first thin film portion 61 extending from the first main electrode portion 51 toward the second external electrode 32, and a second thin film portion 62 extending from the first main electrode portion 51 toward the first external electrode 31. The first thin film portion 61 is thinner than the first main electrode portion 51, and the second thin film portion 62 is thinner than the first main electrode portion 51.

The second internal electrode 122 includes a first connection portion 41 connected to the first external electrode 31, a second main electrode portion 52 contiguous with the first connection portion 41, a second connection portion 42 connected to the second external electrode 32, and a third main electrode portion 53 separated from the second main electrode portion 52 and contiguous with the second connection portion 42. The second main electrode portion 52 is thinner than the first connection portion 41, and the third main electrode portion 53 is thinner than the second connection portion 42.

Within the first internal electrode 121, the first main electrode portion 51 opposes the second main electrode portion 52 and the third main electrode portion 53 with the first dielectric film 11 interposed therebetween, but does not oppose the first connection portion 41 or the second connection portion 42 in a thickness direction of the first dielectric film 11. On the other hand, the first thin film portion 61 opposes the second connection portion 42 with the first dielectric film 11 interposed therebetween in the thickness direction of the first dielectric film 11, and the second thin film portion 62 opposes the first connection portion 41 with the first dielectric film 11 interposed therebetween in the thickness direction of the first dielectric film 11.

The film capacitor according to the third embodiment of the present invention is characterized in that the first internal electrode includes the first thin film portion, and the first thin film portion opposes the second connection portion with the first dielectric film interposed therebetween.

In the film capacitor according to the third embodiment of the present invention, the first internal electrode may not include the second thin film portion, but it is desirable that the first internal electrode include the second thin film portion, and that the second thin film portion oppose the first connection portion with the first dielectric film interposed therebetween.

The first internal electrode is desirably formed by the method illustrated in FIG. 5(a), and the second internal electrode is desirably formed by the method illustrated in FIGS. 5(a) and 5(b). It is desirable that the second connection portion be made of a material having lower electrical conductivity on the side opposing the first thin film portion with the first dielectric film interposed therebetween than on the side opposing the second dielectric film. Further, when the first internal electrode includes the second thin film portion, the first connection portion is desirably made of a material having lower electrical conductivity on the side opposing the second thin film portion with the first dielectric film interposed therebetween than on the side opposing the second dielectric film.

The other configurations are the same as those of the first embodiment.

In the third embodiment having such configuration, the same operation and effect as in the first embodiment can be obtained.

FOURTH EMBODIMENT

In the film capacitor according to the fourth embodiment of the present invention, similar to the third embodiment, both the first external electrode and the second external electrode are connected to the second internal electrode and are separated from the first internal electrode. In the fourth embodiment, unlike the third embodiment, the second internal electrode is provided on a second surface of the first dielectric film.

Figure 9:
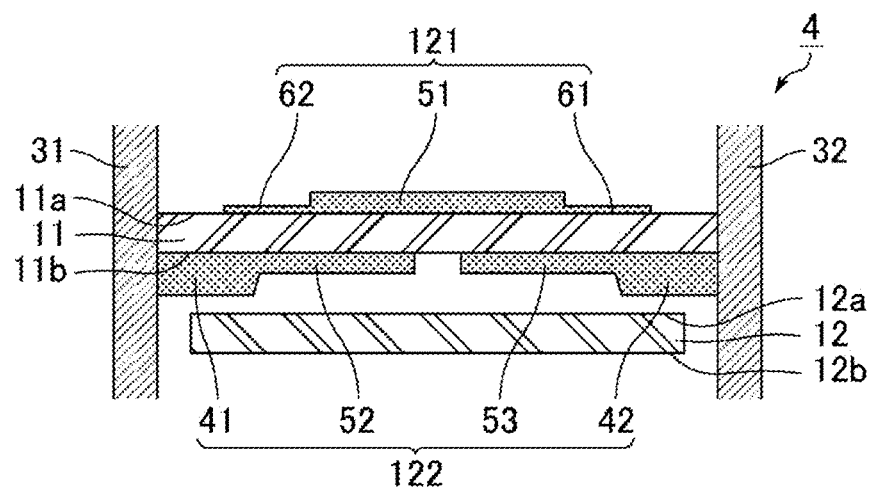
FIG. 9 is a sectional view schematically illustrating an example of a film capacitor according to a fourth embodiment of the present invention.

FIG. 9 is a sectional view schematically illustrating an example of the film capacitor according to the fourth embodiment of the present invention.

Although the overall configuration is not illustrated in FIG. 9, a film capacitor 4 includes a first dielectric film 11, a second dielectric film 12 stacked on the first dielectric film 11, and a first internal electrode 121 and a second internal electrode 122 that oppose each other with the first dielectric film 11 interposed therebetween. The film capacitor 4 further includes a first external electrode 31 connected to the second internal electrode 122 and separated from the first internal electrode 121, and a second external electrode 32 connected to the second internal electrode 122 and separated from the first internal electrode 121.

In the film capacitor 4 illustrated in FIG. 9, the first internal electrode 121 is provided on the first surface 11a of the first dielectric film 11, similarly to the film capacitor 3 illustrated in FIG. 8. On the other hand, unlike the film capacitor 3 illustrated in FIG. 8, the second internal electrode 122 is provided on the second surface 11b of the first dielectric film 11. The second dielectric film 12 is not provided with an internal electrode.

Similar to the film capacitor 3 illustrated in FIG. 8, the first internal electrode 121 includes a first main electrode portion 51, a first thin film portion 61 extending from the first main electrode portion 51 toward the second external electrode 32, and a second thin film portion 62 extending from the first main electrode portion 51 toward the first external electrode 31. Further, the second internal electrode 122 includes a first connection portion 41 connected to the first external electrode 31, a second main electrode portion 52 contiguous with the first connection portion 41, a second connection portion 42 connected to the second external electrode 32, and a third main electrode portion 53 separated from the second main electrode portion 52 and contiguous with the second connection portion 42.

The first internal electrode is desirably formed by the method illustrated in FIG. 5(a), and the second internal electrode is desirably formed by the method illustrated in FIGS. 5(a) and 5(b). The second connection portion is desirably made of a material having a lower electrical conductivity on the side opposite the side opposing the first thin film portion with the first dielectric film interposed therebetween than on the side opposing the first thin film portion with the first dielectric film interposed therebetween. Further, when the first internal electrode includes the second thin film portion, the first connection portion is desirably made of a material having lower electrical conductivity on the side opposite the side opposing the second thin film portion with the first dielectric film interposed therebetween than on the side opposing the second thin film portion with the first dielectric film interposed therebetween.

The other configurations are the same as those of the third embodiment.

In the fourth embodiment having such configuration, the same operation and effect as in the first embodiment can be obtained.

EXAMPLES

Hereinafter, examples specifically disclosing the film capacitor of the present invention will be described. Note that the present invention is not limited to only these examples.

Production of Capacitor

Example 1

Using a PP film with a thickness of 2.5 μm, after depositing aluminum while forming an insulation margin by a non-deposited portion on one end side in a film width direction, by depositing zinc on the aluminum deposition film on the other end side, a connection portion (heavy edge) having a thickness of 50 nm was formed. When aluminum was deposited, a thin film portion having a thickness of 7 nm was formed up to a width of 5 mm on an edge side of the main electrode portion, and a main electrode portion was formed to have a thickness of 15 nm.

The thin film portion was formed by introducing an amount of metal vapor smaller than that of the main electrode portion in a deposition process.

Regarding the obtained metallized film, two films were stacked and wound such that the boundary between the main electrode portion and the thin film portion is located at a position of 4 mm from the edge of the opposing connection portion, that is, the length of the thin film portion opposing the main electrode portion is 4 mm, thereby producing a capacitor (20 μF) of Example 1 (see FIGS. 1, 2 and 3).

Comparative Example 1

Two metallized films produced in the same manner as in Example 1 except that no thin film portion was formed were stacked and wound, thereby producing a capacitor (20 μF) of Comparative Example 1.

Evaluation of Capacitors

The ESR values of the capacitors of Example 1 and Comparative Example 1 were almost the same.

Table 1 illustrates the results of withstand voltage test (105° C., 750 V, applied for 24 hours) of the capacitors of Example 1 and Comparative Example 1.

TABLE 1

|  | Withstand voltage test result (number of dielectric breakdowns/number of times of test) |
| --- | --- |
| Example 1 | 0/12 |
| Comparative Example 1 | 3/12 |

As illustrated in Table 1, the capacitor of Example 1 did not show dielectric breakdown unlike the capacitor of Comparative Example 1. In each of the capacitors of Comparative Example 1, dielectric breakdown occurred at a portion where the end of one internal electrode and the connection portion of the other internal electrode overlapped.

Production of Capacitor

Example 2

Using a 3 μm-thick thermosetting film consisting of a prepolymer body of polyvinyl acetoacetal (PVAA) and tolylene diisocyanate (TDI), after depositing aluminum while forming an insulation margin by a non-deposited portion on one end side in a film width direction, by depositing zinc on the aluminum deposition film on the other end side, a connection portion (heavy edge) having a thickness of 40 nm was formed. When aluminum was deposited, a thin film portion having a thickness of 7 nm was formed up to a width of 5 mm on an edge side of the main electrode portion, and a main electrode portion was formed to have a thickness of 10 nm.

Regarding the obtained metallized film, two films were stacked and wound such that the boundary between the main electrode portion and the thin film portion is located at a position of 4 mm from the edge of the opposing connection portion, thereby producing a capacitor (20 μF) of Example 2 (see FIGS. 1, 2 and 3).

Comparative Example 2

Two metallized films produced in the same manner as in Example 2 except that no thin film portion was formed were stacked and wound, thereby producing a capacitor (20 μF) of Comparative Example 2.

Evaluation of Capacitors

The ESR values of the capacitors of Example 2 and Comparative Example 2 were almost the same.

Table 2 illustrates the results of withstand voltage test (125° C., 750 V, applied for 24 hours) of the capacitors of Example 2 and Comparative Example 2.

TABLE 2

| | Withstand voltage test result (number of dielectric breakdowns/number of times of test) |
|---|---|
| Example 2 | 0/12 |
| Comparative Example 2 | 5/12 |

As illustrated in Table 2, the capacitor of Example 2 did not show dielectric breakdown unlike the capacitor of Comparative Example 2. In each of the capacitors of Comparative Example 2, dielectric breakdown occurred at a portion where the end of one internal electrode and the connection portion of the other internal electrode overlapped.

DESCRIPTION OF REFERENCE SYMBOLS

1, 2, 3, 4: film capacitor
11: first dielectric film
11a: first surface of first dielectric film
11b: second surface of first dielectric film
12: second dielectric film
12a: first surface of second dielectric film
12b: second surface of second dielectric film
21, 121: first internal electrode
21a: fuse portion of first internal electrode
21b: insulation slit of first internal electrode
21c: divided electrode of first internal electrode
21A: first metal deposition film
21B: second metal deposition film
22, 122: second internal electrode
22a: Fuse portion of second internal electrode
22b: insulation slit of second internal electrode
22c: divided electrode of second internal electrode
31: first external electrode
32: second external electrode
41: first connection portion
42: second connection portion
51: first main electrode portion
52: second main electrode portion
53: third main electrode portion
61, 161, 261, 361, 461, 561: first thin film portion
62: second thin film portion
71, 72: insulation margin
$L_{61}$: length of first thin film portion
$L_{614}$: length of first thin film portion opposing second connection portion
$L_{615}$: length of first thin film portion opposing second main electrode portion
$L_{62}$: length of second thin film portion
$L_{624}$: length of second thin film portion opposing first connection portion
$L_{625}$: length of second thin film portion opposing first main electrode portion
$T_{41}$: maximum thickness of first connection portion
$T_{42}$: maximum thickness of second connection portion
$T_{51}$: maximum thickness of first main electrode portion
$T_{52}$: maximum thickness of second main electrode portion
$T_{61}$: maximum thickness of first thin film portion
$T_{62}$: maximum thickness of second thin film portion

The invention claimed is:

1. A film capacitor comprising:
    a stacked body including:
        a first dielectric film having a first surface and a second surface opposite to the first surface;
        a second dielectric film having a first surface and a second surface opposite to the first surface, the second dielectric film being arranged such that the first surface of the second dielectric film opposes the second surface of the first dielectric film;
        a first internal electrode on the first surface of the first dielectric film, the first internal electrode including a first connection portion, a first main electrode portion contiguous with the first connection portion and thinner than the first connection portion, and a first thin film portion extending from the first main electrode portion and thinner than the first main electrode portion; and
        a second internal electrode between the first dielectric film and the second dielectric film, the second internal electrode including a second connection portion, and a second main electrode portion contiguous with the second connection portion and thinner than the second connection portion, wherein
        the first main electrode portion opposes the second main electrode portion with the first dielectric film interposed therebetween, and does not oppose the second connection portion, and
        the first thin film portion opposes the second connection portion with the first dielectric film interposed therebetween;
    a first external electrode on a first end surface of the stacked body and electrically connected to the first connection portion of the first internal electrode and separated from the second internal electrode; and
    a second external electrode on a second end surface of the stack body opposite the first end surface and electrically connected to the second connection portion of the second internal electrode and separated from the first internal electrode,
    wherein, in a direction from the first external electrode to the second external electrode, a length of the first thin film portion is 50,000 times or more a difference between a maximum thickness of the first main electrode portion and a maximum thickness of the first thin film portion.

2. The film capacitor according to claim 1, wherein the second internal electrode is on the first surface of the second dielectric film.

3. The film capacitor according to claim 1, wherein the second internal electrode is on the second surface of the first dielectric film.

4. The film capacitor according to claim 1, wherein
the second internal electrode further includes a second thin film portion extending from the second main electrode portion and is thinner than the second main electrode portion, the second main electrode portion does not oppose the first connection portion with the first dielectric film interposed therebetween, and
the second thin film portion opposes the first connection portion with the first dielectric film interposed therebetween.

5. The film capacitor according to claim 1, wherein the maximum thickness of the first thin film portion is smaller than a difference between a maximum thickness of the first connection portion and the maximum thickness of the first main electrode portion.

6. The film capacitor according to claim 1, wherein the maximum thickness of the first thin film portion is 7 nm or less.

7. The film capacitor according to claim 1, wherein the first thin film portion opposes both the second main electrode portion and the second connection portion.

8. The film capacitor according to claim 7, wherein, in the direction from the first external electrode toward the second external electrode, the first thin film portion is shorter than the first main electrode portion, and a first region of the first thin film portion opposing the second main electrode portion is longer than a second region of the first thin film portion opposing the second connection portion.

9. The film capacitor according to claim 8, wherein, in the direction from the first external electrode toward the second external electrode, a length of the first region of the first thin film portion opposing the second main electrode portion is 4 mm or less.

10. The film capacitor according to claim 1, wherein the second connection portion is made of a material having a lower electrical conductivity than the first thin film portion.

11. The film capacitor according to claim 1, wherein
the second internal electrode is provided on the first surface of the second dielectric film, and
the second connection portion is made of a material having a lower electrical conductivity on a side opposing the first thin film portion with the first dielectric film interposed therebetween than on a side opposing the second dielectric film.

12. The film capacitor according to claim 10, wherein
the second connection portion is made of a material containing zinc as a main component thereof, and
the first thin film portion is made of a material containing aluminum as a main component thereof.

13. The film capacitor according to claim 1, wherein
the first dielectric film contains a curable resin as a main component thereof, and
the second dielectric film contains a curable resin as a main component thereof.

14. A film capacitor comprising:
a stacked body including:
a first dielectric film having a first surface and a second surface opposite to the first surface;
a second dielectric film having a first surface and a second surface opposite to the first surface, the second dielectric film being arranged such that the first surface of the second dielectric film opposes the second surface of the first dielectric film;
a first internal electrode on the first surface of the first dielectric film, the first internal electrode including a first main electrode portion, and a first thin film portion extending from the first main electrode portion and thinner than the first main electrode portion; and
a second internal electrode between the first dielectric film and the second dielectric film, the second internal electrode including a first connection portion, a second main electrode portion contiguous with the first connection portion and thinner than the first connection portion, a second connection portion, and a third main electrode portion separated from the second main electrode portion and contiguous with the second connection portion and thinner than the second connection portion, wherein
the first main electrode portion opposes the second main electrode portion and the third main electrode portion with the first dielectric film interposed therebetween, and does not oppose the second connection portion, and
the first thin film portion opposes the second connection portion with the first dielectric film interposed therebetween;
a first external electrode on a first end surface of the stacked body and electrically connected to the first connection portion of the second internal electrode and separated from the first internal electrode; and
a second external electrode on a second end surface of the stack body opposite the first end surface and electrically connected to the second connection portion of the second internal electrode and separated from the first internal electrode,
wherein, in a direction from the first external electrode to the second external electrode, a length of the first thin film portion is 50,000 times or more a difference between a maximum thickness of the first main electrode portion and a maximum thickness of the first thin film portion.

15. The film capacitor according to claim 14, wherein
the first internal electrode further includes a second thin film portion extending from the first main electrode portion toward the first external electrode and thinner than the first main electrode portion, the first main electrode portion does not oppose the first connection portion with the first dielectric film interposed therebetween, and
the second thin film portion opposes the first connection portion with the first dielectric film interposed therebetween.

16. The film capacitor according to claim 14, wherein the second internal electrode is on the first surface of the second dielectric film.

17. The film capacitor according to claim 14, wherein the second internal electrode is on the second surface of the first dielectric film.

18. The film capacitor according to claim 14, wherein the second connection portion is made of a material having a lower electrical conductivity than the first thin film portion.

19. The film capacitor according to claim 18, wherein
the second connection portion is made of a material containing zinc as a main component thereof, and
the first thin film portion is made of a material containing aluminum as a main component thereof.

* * * * *